Jan. 24, 1967   G. D. ARNOLD ETAL   3,299,526
DEHYDRATOR AND METHOD OF DEHYDRATION PARTICULARLY FOR GRAINS
Filed Oct. 14, 1963

INVENTORS
GERALD D. ARNOLD
ARTHUR H. EPPLER
BY
Wheeler, Wheeler & Wheeler
ATTORNEYS 3,299,526
DEHYDRATOR AND METHOD OF DEHYDRATION PARTICULARLY FOR GRAINS
Gerald D. Arnold, Galesville, Wis. 54630, and Arthur H. Eppler, 2518 W. Wisconsin, Milwaukee, Wis. 53200
Filed Oct. 14, 1963, Ser. No. 316,101
1 Claim. (Cl. 34—12)

This invention relates to a dehydrator and method of dehydration particularly for grains.

In a companion application of Gerald D. Arnold No. 190,972, filed April 30, 1962, now abandoned, a method of dehydrating grains was disclosed. In that application it was pointed out that by completely immersing the grain in water for a very brief period sufficient to limit penetration to the shell or skin of the individual kernels and by then proceeding immediately with dehydration at temperatures of 600 to 1000 degrees Fahrenheit for a period insufficiently long to raise the grain to cooking temperature, it was possible to dry the grain to commercially acceptable milling quality without the cracking or checking of the endosperm, since the evaporation during the brief exposure to the dehydrating gases keeps the kernel cool and the moisture on the skin tends to prevent the skin from being hardened with resulting checking of the endosperm. It was also pointed out that the very hot gases employed in this process evaporate moisture from the skin, the vapor enveloping the grain during at least the first part of the dehydrating process.

It has been found that high humidity (preferably in the form of steam) is extremely important and is not necessarily dependably created by merely moistening the skin of the kernel prior to dehydration. Uniformity is very desirable. The moisture bath should not penetrate appreciably into the kernel and if the kernel has little moisture content at the start of the operation the resulting moisture may be insufficient to maintain the desired high humidity throughout the dehydrating operation.

Accordingly, the present invention contemplates injection of water in the form of spray into the intake tube through which hot dehydrating gas at a temperature far above the boiling point of water is passing between the furnace and the drum. The injection of spray into the intake of a dehydrator drum was disclosed in the W. A. Arnold Patent 2,143,505 of January 10, 1939, but this was done for cooling only and the functioning of the spray was normally limited to the period when the dryer was being shut down, there being no suggestion therein of an attempt to maintain uniform humidity during a continuing drying operation for the purpose of protecting the grain from injury during dehydration of moisture from the inner kernel.

In order to dehydrate grain, it is desirable first, to ascertain the initial moisture content of the grain to properly gauge the functioning of the controls. Secondly, the grain should be fed uniformly. Thirdly, the time of exposure of the grain to the water bath before entering the dryer should be carefully predetermined and controlled by the depth of the water bath and the speed of the conveyor. Next, the control of the intake air dampers and the intake gas temperature and the rate of air flow should be controlled to regulate the period and temperature of exposure of the grain to the dehydrating air and finally, with particular reference to the subject matter of the present application, a spray of water into the intake stream of hot gas, preferably in advance of exposure of the grain thereto, should be accurately regulated to maintain uniform high humidity and preferably steam throughout the interior of the drum during dehydration, also securing a low outlet temperature.

With the foregoing mode of operation, a dryer embodying the present invention can dry shelled corn or the like of any initial moisture content down to any desired final moisture content without checks or cracks in the endosperm. Accordingly, the grain will have good milling quality without injury to the starch, oil or gluten content. If the grain is cooled immediately following dehydration, as is preferred, this will assist in keeping the dehydrated uncooked grain in a first class saleable condition suitable for milling throughout any normal period of dry storage.

A conventional grain dryer uses an inlet temperature of about 140° F., maximum, to keep the grain from developing checks and cracks in the endosperm. With that low temperature, the capacity is very limited and the required long exposure of two to five hours heats up the grain to the temperature of the intake air. If the grain has an initial moisture content of thirty percent or more, two or three passes through such a dryer are necessary to get the grain down to the maximum moisture content of fourteen percent recommended for storage. In contrast, a dryer in accordance with the present invention can use an inlet gas temperature of 600° to 1200° (1000° F. preferred) and still maintain an outlet gas temperature of 140° F. to 175° F. and will dry thirty-five percent moisture corn down to twelve percent in one pass through the drum with only twenty to forty minute exposure to the hot gases, the maximum temperature of grain at delivery being materially below that of the gas. Moreover, the grain will be free of checks and cracks in the endosperm and will be a good saleable product which will keep properly in storage. The drying capacity is approximately fifty times the capacity of a conventional dryer using 140° intake temperature. Yet the limited period of exposure and high rate of evaporation cooling keeps the grain from becoming cooked or unduly dehydrated.

Figure 1:
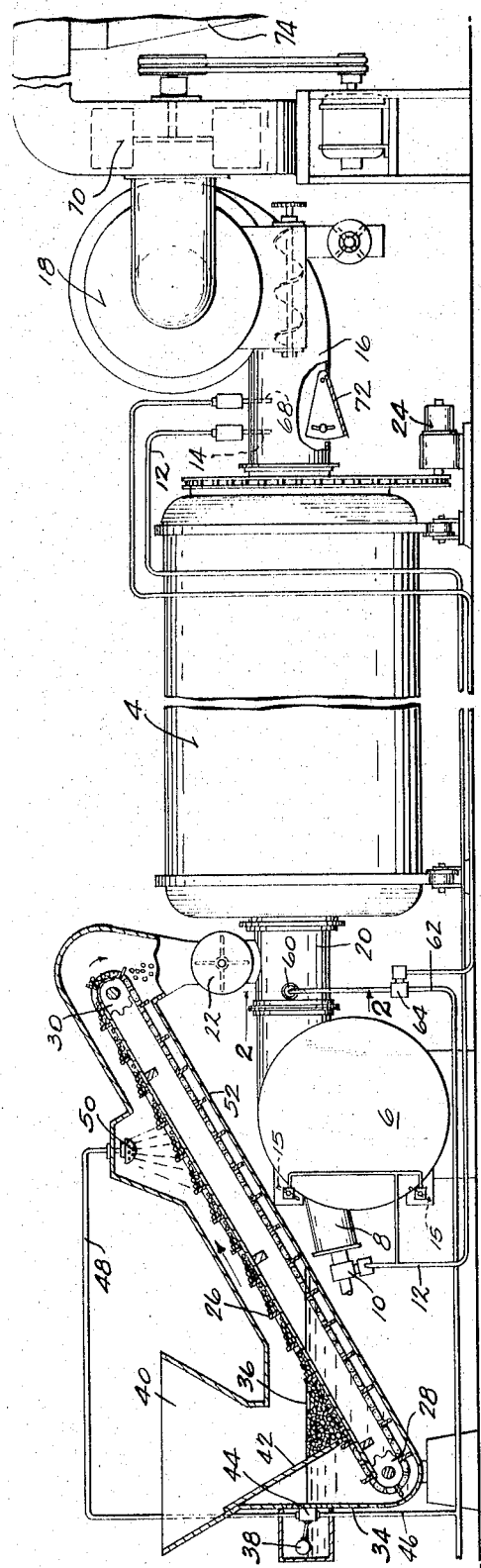
FIG. 1 shows a view partially in side elevation and partially in longitudinal section through a dehydrator suitably designed for grain and embodying the invention herein disclosed.
Figure 2:
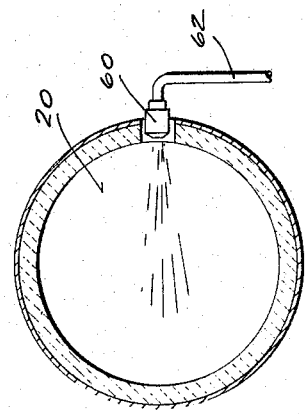
FIG. 2 is an enlarged detail view taken in section on the line 2—2 of FIG. 1.

The dehydrating drum 4 is preferably a triple pass drum of the type shown in Gerald Arnold Patent No. 2,822,153, dated February 4, 1958. It is supplied with dehydrating gases by a furnace 6 preferably of the construction disclosed in Gerald Arnold application for United States Patent Serial No. 190,971, now Patent No. 3,179,150 filed April 3, 1962. The dehydrating gases may comprise products of combustion developed by a burner 8, the gas temperature being controlled by air dampers 15 and fuel valve 10 operated pneumatically or electrically by line 12 from a thermostat 14 in the outlet pipe 16 which leads from the drum 4 to the centrifugal separator 18. The dampers 15 open for admitting ambient air to the furnace as the valve 10 closes and vice versa to maintain the drying gas at the desired level and to maintain the grain in motion through the drum 4.

The flue gas and other hot dehydrating gases from furnace 6 are admitted to drum 4 through a throat 20 into which the material to be dehydrated, in this instance grain, is delivered through a charging valve 22. In the throat, the grain is entrained in the stream of high velocity, high temperature gases from the furnace 6 and carried into the dryer wherein it is caused to advance by the flow of hot gases as the grain is dropped repeatedly across the flow during rotation of the drum 4 by motor 24.

The grain is fed into the apparatus at a uniform rate. A convenient means of accomplishing this result is a conveyor 26 operating over a lower sprocket 28 and upper sprocket 30, the conveyor dropping the grain into the charging valve 22 as it traverses the upper sprocket. The lower sprocket 28 is preferably placed below water level in a trough 34 wherein the water level is indicated at 36 and maintained by the float 38.

The hopper 40 into which the grain is discharged delivers the grain directly into the water bath. A baffle at 42 tends to position the grain on the conveyor so that it will pass within a matter of a few seconds out of the water bath toward the elevated sprocket and point of discharge at 30. The float 38 controls the water level by means of a float-controlled valve at 44 into which water enters through line 46 and from which it leaves by line 48 to a spray head 50 overlying the upper end of the conveyor so that the grain is kept moist as it rises on the conveyor to the point of discharge into the charging valve 22. The bottom 52 of the conveyor trough leads back into the water bath 34 and thereby maintains water level by the functioning of the float valve 44.

Water spray nozzle 60 is directed into the side of the flue gas throat 20 and is supplied with water by a line 62 subject to the control of the valve 64 operated from the thermostat or hygrostat 68 exposed to gases which have acted on the grain. Either instrument may be used, preferably in the pipe through which gases and entrained water picked up in the drying of the grain are withdrawn from the drum 4 to the separator 18 under pressure differential established by a large blower at 70 which takes gas from the separator 18 and discharges it through the exhaust cyclone (fragmentarily shown at 74) to the atmosphere.

The method of operation is such as to maintain a very high humidity in the drum 4, usually in the form of supersaturated steam, continuously throughout the dehydrating operation. The initial moistening of the shell of each kernel of grain followed by maintenance of high humidity in the dryer prevents the cracking of the endosperm during dehydration. Otherwise, the shell would become hardened after surface moisture has been evaporated by the initial contact with the dehydrating gases. Thereafter, continued exposure to the gases for extracting the moisture within the kernel would result in cracking the endosperm.

Accordingly, the thermostat or hygrostat 68 exposed to the outlet gas issuing from the drum is so coupled with the valve 64 as to keep the spray 60 in nearly continuous operation, the precise relative rate of operation depending upon the amount of moisture which enters the drum with the grain, and particularly the moisture contained in the kernel. The moisture with which the shell is saturated does not penetrate beyond the shell to the interior of the kernel and this can be controlled by regulating the rate of operation of the conveyor 26 and the depth of the water as shown by water level 36 in the bath 34. The only variable, in the preferred operation, is the internal moisture within the kernel. Consequently, the nozzle 60 and valve 64 are preferably arranged so that at least a minimum spray of water will enter the dehydrating gases at all times, the valve 64 serving to increase and decrease the rate of flow according to whether the valve is open or shut. In this way, a constant high humidity atmosphere preferably including saturated steam is maintained at a substantially constant value within the drum 4 during dehydration.

In the preferred practice of the invention, an adjustable inlet damper is preferably provided at 72 to admit ambient air into the stream of gas and vapor flowing from the drum 4 to the separator 18. This abruptly drops the temperature and initiates immediate cooling of the grain during separation in the cyclone separator 18. This damper is also of assistance in regulating gas circulation and thereby timing the exposure of the grain to dehydrating gases in the drum.

Reference has been made to the fact that the instrument 68 may be a thermostat or a hygrostat. It is used, of course, to control humidity in the drum. However, it may be a simple thermostat and still accomplish this result because the factors other than temperature which control humidity are so carefully regulated in the functioning of the apparatus. As was suggested in W. A. Arnold Patent 2,143,505, the instrument 68 may simply constitute a second contact on the thermostat 14 which controls the furnace temperature. This is practical if the control is electrical. The preferred are pneumatic controls and depend on separate instruments at 14 and 68.

By way of example and not by way of limitation, it may be noted that the dehydrating drum and furnace as used independently of the present invention for dehydrating green produce has a capacity of removing more than 5000 pounds of water per hour. The amount of water added in accordance with the present invention, including both the water in or on the shell of the grain kernel and the water sprayed into the dehydrating gas inlet totals only about ten to twenty gallons of water per hour when drying grain of twenty to twenty-five percent moisture content. The amount of water added is very small as compared with the overall dehydrating capacity of the equipment. Addition of more water, within reasonable limits, to the inlet gases will lower the outlet gas temperature and the discharge grain temperature; yet drying is unimpaired. Yet it protects the grain from injury during dehydration by maintaining high humidity within the dehydrating drum and maintaining a low outlet temperature.

Before initiating the feed of grain into the equipment, a spray of water from the nozzle 60 into the throat 20 is commenced at the rate of two to ten gallons per hour immediately after the furnace is set into operation. When even feeding of grain is started by initiating operation of the conveyor 26, the resulting continued evaporation in the presence of steam within the drum will protect even the first increment of grain from being excessively dried as it progresses through the dehydrating drum.

If the initial moisture content of the grain is thirty-five to forty-five percent or over, the water bath treatment of the grain is not as important as if the grain had an initial moisture content of a lower value. However, even with high moisture grain, it is desirable to spray water into the intake as herein disclosed and to maintain the spray at a greater or lesser volume through the dehydrating operation. Passage of whole grain through the drum requires only twenty to forty minutes in time, depending on grain weight, and the grain is discharged at a much lower temperature than the moisture-laden gases at the outlet.

The resulting grain is free of checks and cracks in the endosperm and has no case hardening of the pericap or shell. The temperature of the grain is not unduly raised in the process of dehydration and the grain does not shatter in mechanical handling thereafter. As soon as cooled, it is ready for storage or for sale.

While the foregoing discussion has been based largely on the dehydration of grain for storage and subsequent milling, it should be observed that the process is also desirable in dealing with grain which may have been cracked or damaged in large or substantial part by shelling opc.- ations in the field or otherwise. In the past, it has been difficult for conventional grain dryers to handle previously cracked corn, for example, because it tends to retard air flow through the corn and to clog the drying apparatus and the screens. The apparatus and method herein disclosed will handle the cracked grain just as effectively as the whole grain and leave it in perfect condition to be used for food either for human beings or cattle. It will be less suitable for storage merely because of the previous cracking and not as a result of any treatment or lack of treatment received in the practice of the present invention.

In the use of a conventional grain dryer, processors complain that they are unable effectively to remove the starch and the oils from the whole or cracked kernels. In the practice of the present invention, the oil and starch can be removed just as effectively from the cracked kernels as from the whole kernels. Also the food nutrients and vitamins are unimpaired whether the grain is whole or cracked.

We claim:

A method of dehydration of grain which comprises exposing the grain to a current of dehydrating gas at temperatures above the boiling point of water, and introducing water vapor into the gas of said current before exposing the grain thereto, and carrying out the dehydrating process in the presence of such vapor at a rate at which water is continuously evaporating into the gas of said current whereby continued evaporation of water continuously cools the grain, and discharging the dehydrated grain from the gas of said current before the grain reaches temperature damaging thereto.

References Cited by the Examiner

UNITED STATES PATENTS

| | | | |
|---|---|---|---|
| 741,436 | 10/1903 | Atwood | 34—9 |
| 1,420,679 | 6/1922 | Beckworth et al. | 34—13 |
| 1,711,574 | 5/1929 | Miller | 34—28 |
| 2,143,505 | 1/1939 | Arnold | 34—28 |
| 2,145,495 | 1/1939 | Paxton | 34—9 |
| 2,295,918 | 9/1942 | Thomas | 34—136 |
| 2,466,297 | 4/1949 | Ball | 34—136 |

MARTIN P. SCHWADRON, *Primary Examiner.*

JOHN F. O'CONNOR, FREDERICK L. MATTESON, Jr., *Examiners.*

B. L. ADAMS, *Assistant Examiner.*